United States Patent
Dreimann et al.

(10) Patent No.: US 7,568,641 B2
(45) Date of Patent: Aug. 4, 2009

(54) METHOD AND APPARATUS FOR DETERMINING WEAR AND TEAR IN MACHINES

(75) Inventors: Markus Dreimann, München (DE); Wolfgang Fick, München (DE); Uwe Gerk, Frensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 198 days.

(21) Appl. No.: 10/589,370

(22) PCT Filed: Jun. 25, 2004

(86) PCT No.: PCT/EP2004/006920

§ 371 (c)(1),
(2), (4) Date: Aug. 15, 2006

(87) PCT Pub. No.: WO2005/091097

PCT Pub. Date: Sep. 29, 2005

(65) Prior Publication Data

US 2007/0164140 A1     Jul. 19, 2007

(30) Foreign Application Priority Data

Feb. 19, 2004  (EP) .................... 04003711

(51) Int. Cl.
*B02C 19/00* (2006.01)

(52) U.S. Cl. ............... 241/33; 241/37; 73/7; 324/71.2

(58) Field of Classification Search ............. 241/30, 241/33–37; 73/7; 324/71.1, 772
See application file for complete search history.

(56) References Cited

U.S. PATENT DOCUMENTS

| 4,464,866 A | | 8/1984 | Smith et al. |
| 5,251,144 A | * | 10/1993 | Ramamurthi ............ 700/177 |
| 5,315,789 A | * | 5/1994 | Takashi ..................... 451/5 |
| 5,523,701 A | | 6/1996 | Smith et al. |

FOREIGN PATENT DOCUMENTS

| DE | 38 28 594 A1 | 3/1989 |
| EP | 0 509 817 B1 | 10/1992 |
| JP | 63141654 A | 6/1988 |
| JP | 6031187 A | 2/1994 |
| JP | 2004017057 A | 1/2004 |

* cited by examiner

Primary Examiner—Mark Rosenbaum

(57) ABSTRACT

A method and apparatus for determining wear and tear in machines includes a method that determines a voltage draw and/or a current draw of a first subsystem of the machine during its operation, and wear and tear present in a second machine subsystem is determined based on the draw determined in the first subsystem. In one embodiment, a coal grinding machine includes a drive, a coal grinding mill driven by the drive, a device for determining an electrical draw of a current and/or voltage draw of the drive during operation, and a device for inferring wear and tear present in the coal grinding mill on the basis of voltage and/or current draw determined in the drive. The machine can include a device for inferring the quality or type of material (like coal) being processed in the mill based on the draw determined in the drive.

14 Claims, 1 Drawing Sheet

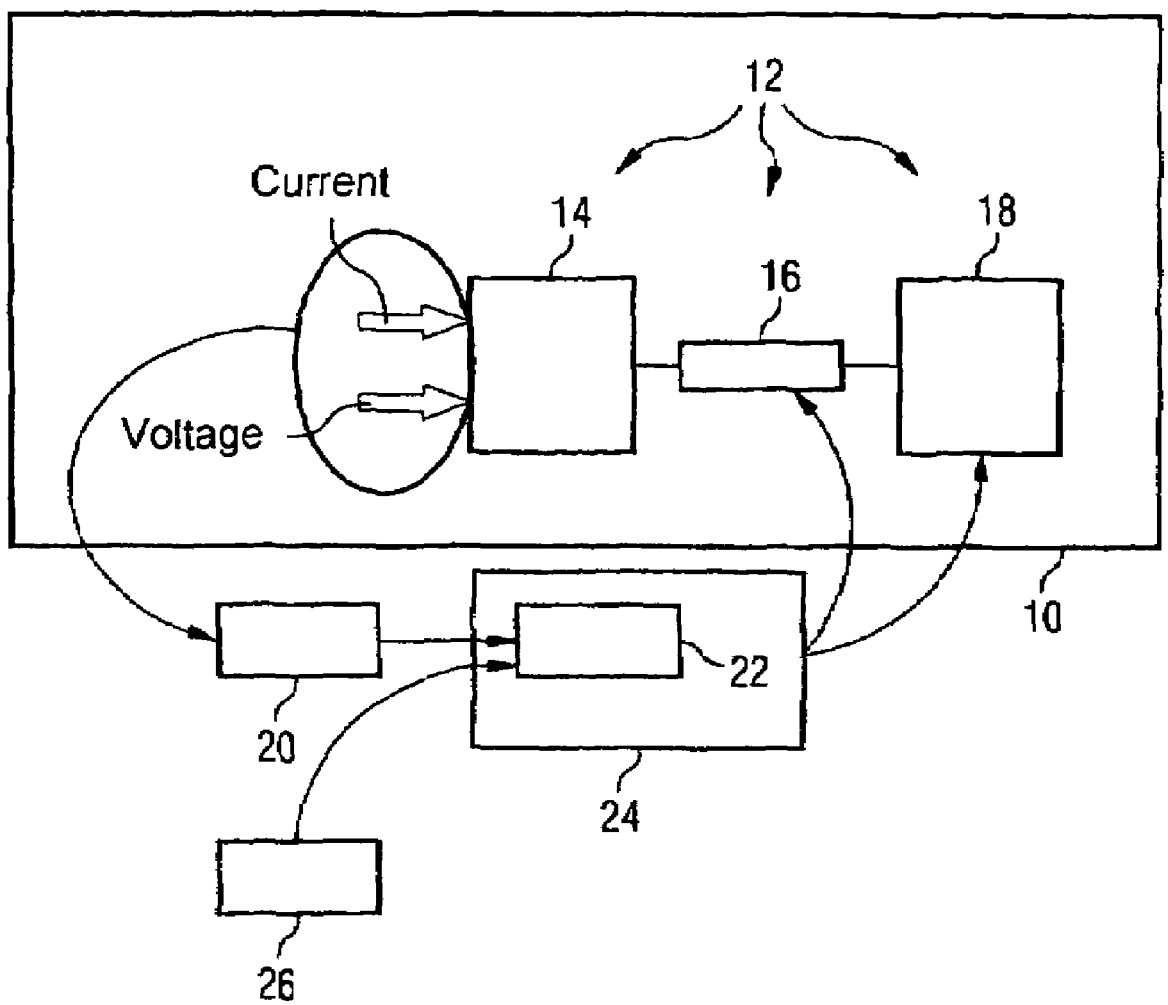

METHOD AND APPARATUS FOR DETERMINING WEAR AND TEAR IN MACHINES

CROSS REFERENCE TO RELATED APPLICATIONS

This application is the US National Stage of International Application No. PCT/EP2004/006920, filed Jun. 25, 2004 and claims the benefit thereof. The International Application claims the benefits of European application No. 04003711.1 EP filed Feb. 19, 2004. All of the applications are incorporated by reference herein in their entirety.

FIELD OF INVENTION

The invention relates to a method for determining wear and tear in machines or systems, such as a coal preparation facility in a power plant. The particular feature of such machines or systems is that they are composed of interconnected subsystems which in turn consist of various components.

BACKGROUND OF INVENTION

For such systems or plants in the industrial and power plant field, diagnostics, wear and tear determination and early detection of malfunctions play an important role. Traditionally, dedicated measuring systems are used on the subsystems or components, such as temperature measuring, thermography, vibration monitoring and many other methods for determining wear and tear in the associated subsystems and components. The measuring systems generally consist of both measuring apparatuses and evaluating processors which often have to be specially designed, adapted and installed. For example, subsystems of coal preparation facilities in the power plant industry must be equipped with sensors which although they provide specific and relatively accurate diagnostics, these diagnostics are at the same time comparatively complex and expensive.

SUMMARY OF INVENTION

The object of the invention is to provide a method, which can be implemented comparatively inexpensively, for determining wear and tear in machines, particularly in coal grinding machines or coal preparation facilities for power plants.

This object is achieved according to the invention by a method for determining wear and tear in machines, wherein a current and/or voltage draw of at least one first subsystem of the machine is determined during its operation and any wear present in at least one second subsystem of the machine is inferred therefrom.

Moreover, the inventive object is achieved with a coal grinding machine comprising a drive and a coal grinding mill driven by same, wherein there is provided a device for determining a current and/or voltage draw of the drive during operation and a device for inferring any wear present in the coal grinding mill.

The inventive solution is based on diagnosing the reaction of one subsystem on another subsystem by analyzing the current and/or voltage draw of the first subsystem. As with known machines or subsystems the current and/or voltage draw of the individual subsystems during operation is generally already being determined, the diagnostics according to the invention can generally be achieved merely by an appropriate machine control adjustment and by associated software solutions. The costs of the solution according to the invention are therefore comparatively low.

In an advantageous embodiment of the solution according to the invention, the current and/or voltage draw is determined on a machine drive, such as an electric motor, and wear present on a machine unit driven by the drive is inferred therefrom. The unit is advantageously e.g. a coal grinding mill.

To ensure that the inventive diagnostics for the reaction between the subsystems can be implemented in a comparatively precise yet particularly inexpensive manner, it is advantageous if the machine's drive and the driven unit are coupled via a force and/or torque transmitter in a rigid or stiff manner, i.e. without substantial elastic elements within the force and/or torque transmitter.

The current and/or voltage signal of the machine is advantageously sampled at regular intervals, preferably at a frequency of between 5 and 20 kHz.

To determine the wear in the machine or rather the second subsystem, instantaneous values (e.g. at a predetermined point in time), and/or average values (e.g. root mean square (RMS) from time and high frequency signals) and/or at least one frequency spectrum of a current and/or voltage signal (e.g. by means of frequency analysis such as Fast Fourier Transformation (FFT) by characteristic frequency responses in the high frequency range) are advantageously used.

For wear and tear determination according to the invention, additional operating data or process data can advantageously be used.

This operating data advantageously relates to the load state and/or the speed and/or an operating temperature and/or an operating pressure of the machine in order to be able to differentiate load changes and ambient temperature variations from actual mechanical wear and tear.

In addition to the diagnostics according to the invention or even independently therefrom, the quality and/or nature of the material being processed by the machine can be gauged from the current and/or voltage draw determined. In the case of a coal grinding machine, for example, in particular the quality and type of coal used can be assessed. It may be ascertained e.g. if the coal has a high inert component, and the origin of the coal from various parts of the world can also be inferred.

The inventive solution is particularly well suited to a coal grinding machine or coal preparation facility of a power plant where a coal grinding mill is driven directly via a shaft of a squirrel cage motor. Measurements have shown that mechanical wear and the occurrence of defects can be detected from the motor's current and/or voltage signal. For example, grinding ball wear in the coal grinding mill is indicated if marked changes in the frequency spectrum of the current and/or voltage signal are observed at certain characteristic frequencies.

In addition, coal grinding mill wear can be inferred from various trends in the frequency spectrum and in the variation in the average values and time signals.

As a further additional benefit of the inventive solution, the current state of the relevant drive unit can be deduced and damage detected.

An exemplary embodiment of an inventive method for determining wear and tear in machines will now be explained in greater detail using a coal grinding mill as an example and with reference to the accompanying schematic drawing in which:

BRIEF DESCRIPTION OF THE DRAWING

The FIGURE schematically illustrates a coal grinding machine and the associated diagnostic device according to the invention.

DETAILED DESCRIPTION OF INVENTION

The upper half of the FIGURE shows the technical apparatus considered inventive and the lower half the associated method according to the invention.

A machine or rather a plant system in the form of a coal grinding machine 10 specifically has three subsystems 12, namely a drive in the form of a squirrel cage motor 14, a force and/or torque transmitter in the form a shaft 16 to which other components (not shown) such as a gearbox, clutch and/or brake may possibly be connected, as well as a driven unit in the form of a coal grinding mill 18.

The squirrel cage motor 14 is coupled to the unit 18 in a rotationally stiff manner by means of the shaft 16 without interposed elastic elements.

To operate the coal grinding mill 18, the squirrel cage motor 14 draws electrical power, a current and/or voltage signal being derived from this power input.

The current and/or voltage signal is fed to a device 20 for determining the current and/or voltage draw of the drive. By analyzing the frequency spectrum of the current and/or voltage signal, changes at particular characteristic frequencies may be observed. With the aid of a device 22, any wear present in the coal grinding mill 18 can be inferred from the changes detected. In this process the device 22 for inferring any wear in particular analyzes trends in the frequency spectrum and in the characteristic of average value and time signals of the current and/or voltage signal of the squirrel cage motor 14. These diagnostics are further supplemented by a device 24 for inferring the quality and/or type of material being processed by the coal grinding mill 18.

There is additionally provided a device 26, by means of which further operating data is acquired and from which the current state of the squirrel cage motor 18 is derived, the operating data being used to validate the data determined with the device 20.

The diagnostics performed with the aid of the devices 22, 24 and 26 have the following advantages over conventional methods:

No addition sensors need to be provided on the subsystems 16 and 18 following the drive unit or more precisely squirrel cage motor 14. Instead of which, it is merely necessary e.g. for a signal processing unit to be mounted directly on an electrical clamp connection or an associated switchgear unit of the squirrel cage motor 14.

Due to the inventive elimination of failure-critical sensors and cabling, higher diagnostic reliability is additionally ensured. In harsh industrial environments it is often difficult to use additional sensors. For example, sensors and/or cable connections for vibration measurement often cannot be placed at the metrologically relevant locations in a coal grinding mill.

In contrast to the known techniques, the solution according to the invention therefore provides considerable benefits in terms of cost and competitiveness.

The invention claimed is:

1. A method for determining wear and tear in machines of a coal grinding mill, comprising:
   determining an electrical draw comprising at least one of a voltage draw or a current draw of a first subsystem of a machine of the coal grinding mill during its operation;
   determining wear and tear present in a second machine subsystem of the coal grinding mill based on the determined draw of the first subsystem; and
   inferring a coal type or a coal quality of a coal being ground by the mill via the determined electrical draw.

2. The method according to claim 1, wherein the wear determining step comprises, inferring the wear and tear in a unit of the second subsystem driven by the drive based on the determined draw of the drive.

3. The method according to claim 2, wherein the determining step comprises, determining the draw on the drive of the first subsystem which is rigidly coupled via a transmitter comprising, at least one of a force transmitter or a torque transmitter, with the drive unit of the second subsystem.

4. The method according to claim 2, wherein the draw determining step comprises, sampling at least one of a current or voltage signal of the machine with a frequency of between approx. 5 and approx. 20 kHz.

5. The method according to claim 2, wherein the draw determining step comprises, determining at least one of instantaneous values, average values or a frequency spectrum of the signal of the first subsystem of the machine.

6. The method according to claim 2, further comprising, acquiring further operating data about the first subsystem; determining the wear and tear in the second subsystem; and validating the data from the draw-determining step.

7. The method according to claim 6, operating data acquiring step, further comprising, acquiring at least one of the load state, the speed, an operating temperature or an operating pressure.

8. A method for determining the operational effects in an industrial power plant coal grinding system having a plurality of interconnected systems, the method comprising:
   determining an electrical draw comprising at least one of a voltage draw or a current draw of a first subsystem of the machine system during its operation;
   determining operational effects in a second subsystem in the machine based on the determined draw in the first subsystem; and
   inferring a coal type or a coal quality of a coal being processed via the determined electrical draw.

9. A coal grinding machine comprising:
   a drive;
   a coal grinding mill driven by the drive;
   a determining device that determines an electrical draw of at least one of a current or voltage draw of the drive during operation in communication with the drive;
   an inferring device that infers wear and tear present in the coal grinding mill on the basis of electrical draw determined in the drive; and
   a further inferring device that infers a coal type or a coal quality of a coal being processed via the determined electrical draw.

10. The coal grinding machine according to claim 9, wherein the drive comprises a squirrel cage motor; and
   the machine further comprises,
      a shaft rigidly coupled with the motor and the coal grinding mill in a rotationally stiff manner without interposed elastic elements.

11. The coal grinding machined according to claim 10, wherein the shaft comprises, a transmitter comprising at least one of a force transmitter or a torque transmitter, rigidly coupling the motor and coal grinding mill.

12. The coal grinding machine according to claim 9, wherein the draw determining device further comprises, means for determining the frequency spectrum and average values and time signals in the drive, and wherein the wear-inferring device further comprises, means for inferring wear in the coal grinding mill from trends in the frequency spectrum and in the variation in the average values and time signals determined by the draw determining device.

13. The coal grinding machine according to claim 9, further comprising, means for deducing the current state of the coal grinding mill based on predetermined current states determined by the draw-determining device.

14. The coal grinding machine according to claim 10, wherein the draw determining device comprises, a signal processing unit mounted directly on and in electrical connection with the motor of the drive.

* * * * *